(12) United States Patent
Song

(10) Patent No.: US 7,762,413 B2
(45) Date of Patent: Jul. 27, 2010

(54) NURSING BOTTLE HOLDER

(76) Inventor: Karen May Song, 3411 Teckia Blvd., Amarillo, TX (US) 79108

( * ) Notice: Subject to any disclaimer, the term of this patent is extended or adjusted under 35 U.S.C. 154(b) by 844 days.

(21) Appl. No.: 11/396,523

(22) Filed: Apr. 3, 2006

(65) Prior Publication Data

US 2006/0278598 A1 Dec. 14, 2006

Related U.S. Application Data

(60) Provisional application No. 60/668,145, filed on Apr. 4, 2005, provisional application No. 60/685,757, filed on May 27, 2005.

(51) Int. Cl.
*A61J 9/08* (2006.01)
(52) U.S. Cl. ..................................... 215/11.6
(58) Field of Classification Search ................ 150/901; 215/306, 391, 11.3; D30/121, 133
See application file for complete search history.

(56) References Cited

U.S. PATENT DOCUMENTS

| | | | | |
|---|---|---|---|---|
| 1,208,922 A | * | 12/1916 | Dawkins | 604/77 |
| 1,632,347 A | * | 6/1927 | Pipkin | 215/395 |
| 1,723,731 A | * | 8/1929 | Hafling | 215/11.6 |
| 2,409,820 A | * | 10/1946 | Zimmern | 215/12.1 |
| 2,483,979 A | * | 10/1949 | Morrill | 219/437 |
| 2,685,318 A | * | 8/1954 | Merkle | 215/395 |
| 2,994,448 A | * | 8/1961 | Sepe et al. | 215/395 |
| 3,065,944 A | * | 11/1962 | Liebendorfer | 248/102 |
| 3,584,818 A | * | 6/1971 | Essman | 248/105 |
| 4,537,341 A | * | 8/1985 | Kelly | 224/620 |
| 4,856,647 A | * | 8/1989 | Dahne | 206/5.1 |
| 4,925,042 A | * | 5/1990 | Chong | 215/11.1 |
| 4,979,629 A | * | 12/1990 | Askerneese | 215/11.1 |
| 5,301,825 A | * | 4/1994 | Di Scala et al. | 215/11.1 |
| 5,356,016 A | * | 10/1994 | Wiedemann | 215/11.3 |
| 5,397,039 A | * | 3/1995 | Parcelles | 224/148.5 |
| 5,613,657 A | * | 3/1997 | Olaiz | 248/102 |
| 5,704,505 A | * | 1/1998 | Singh | 215/397 |
| 5,871,184 A | * | 2/1999 | Kaopio | 248/102 |
| 6,772,891 B1 | | 8/2004 | Song | |
| 6,923,332 B1 | | 8/2005 | Thomas | |
| 2002/0040910 A1 | * | 4/2002 | Pahl | 220/709 |
| 2002/0077018 A1 | * | 6/2002 | Rice | 446/74 |
| 2004/0231301 A1 | | 11/2004 | Vandertuin et al. | |
| 2006/0008322 A1 | | 1/2006 | Didik | |

FOREIGN PATENT DOCUMENTS

GB 2139504 A * 11/1984

* cited by examiner

*Primary Examiner*—Anthony Stashick
*Assistant Examiner*—Robert J Hicks

(57) ABSTRACT

A holder for use with a nipple-topped nursing bottle includes a sleeve portion for covering the nursing bottle. Surrounding the sleeve portion is a ring portion. The ring portion may be grabbed and squeezed by the animal being nursed during the nursing process. Such grabbing and squeezing during the nursing process overcomes the reluctance of the animal to take nourishment through the nipple of nipple-tipped nursing bottle and shortens the time during which an animal may be weaned to a nipple-tipped nursing bottle.

8 Claims, 7 Drawing Sheets

NURSING BOTTLE HOLDER

CROSS REFERENCE TO RELATED APPLICATION

This patent application claims the benefit of U.S. Provisional Patent Application 60/668,145 filed Apr. 4, 2005 and U.S. Provisional Patent Application 60/685,757 filed May 27, 2005.

STATEMENT REGARDING FEDERALLY SPONSORED RESEARCH AND DEVELOPMENT

The invention described in this patent application was not the subject of federally sponsored research or development.

FIELD

The present invention is a system used for nursing a baby animal or a human infant; more particularly the present invention is a system for enhancing the ability of a baby animal or an infant human to consume and thereby obtain nourishment from a fluid contained in a nipple topped bottle.

BACKGROUND

A bottle cover used for nursing animals is described in my prior U.S. Pat. No. 6,772,891 which is incorporated herein by reference.

Experiences with the comfort Grip Bottle Holder described in my prior U.S. Pat. No. 6,772,891 have revealed that several modifications and changes will enhance the operability of my prior invention and make the nursing experience more pleasurable for the baby animal or the human infant being nursed. In addition, the modifications and changes make the experience of nursing a baby animal or a human infant more pleasurable for the person feeding a liquid to a baby animal or to a human infant.

Animal care technicians and others who work in veterinary clinics or those animal care technicians responsible for caring for animals in zoos are frequently called upon to use a nipple topped nursing bottle to nurse baby animals. In many situations, either orphaned baby animals or baby animals that have a mother that is unable to nurse are reluctant to consume fluid from a nipple-topped bottle because of its unfamiliarity.

The use of a fabric sleeve around the bottle and a fabric portion around the nipple portion of the nipple topped nursing bottle, particularly where the fabric sleeve and the fabric portion around the nipple bear the sent of the mother or a sibling animal as disclosed in my prior U.S. Pat. No. 6,772,891, have produced dramatic improvements in overcoming the reluctance of baby animals to take fluid from a nipple topped nursing bottle. The most pronounced effect was seen in the youngest of the baby animals. These very young baby animals actually place their mouth and nose within the center of the fabric portion surrounding the nipple. As some of the baby animals grew older and became more used to nursing from a nipple topped nursing bottle, the reluctance to consume liquid from the nipple topped nursing bottle occurred again.

Animal care technicians who work in veterinary clinics and zoos have also reported that after the baby animal became used to nursing from a nipple topped bottle, the animal care technicians would often receive scratches from the baby animal's claws while feeding the baby animal with a nipple topped nursing bottle. Many veterinary technicians and zoo workers solved this problem by simply wearing thick claw-resistant gloves while feeding baby animals with a nipple topped nursing bottle. However, the use of thick claw-resistant gloves seemed to bother some baby animals. Further, the use of thick claw-resistant gloves removed the pleasure of the experience of nursing a baby animal from the veterinary technician or zoo worker.

Accordingly, a need has arisen to solve the problem of the reluctance of older baby animals to use a nipple topped nursing bottle as well as the problem of veterinary technicians and zoo workers being clawed while nursing baby animals.

SUMMARY

The nipple topped nursing bottle holder of the present invention is an improvement to the nursing bottle system disclosed in my U.S. Pat. No. 6,772,891 and overcomes the reluctance of baby animals to obtain liquid from a nipple topped nursing bottle and reduces the chances that the person nursing the baby animal will be clawed during the nursing process.

The present invention includes an expandable fabric sleeve portion covering the bottle portion of the nipple topped nursing bottle. Also included is a fabric collar surrounding the nipple. Surrounding the expandable fabric sleeve portion is a slidable, squeezable toroidal ring which may be positioned along the length of the nipple topped nursing bottle. The position of the slidable, squeezable toroidal ring on the nipple topped nursing bottle is set according to the size of the baby animal so that the baby animal may place its front paws on the slidable, squeezable toroidal ring while nursing and then knead, push or squeeze the toroidal ring.

It has been discovered that nursing baby animals are better able to use a nipple topped nursing bottle if they are provided with a soft object to knead, push or squeeze with their front paws during the nursing process. Such soft object does not appear in my U.S. Pat. No. 6,772,891.

BRIEF DESCRIPTION OF THE DRAWING FIGURES

A better understanding of the bottle holder for a nipple topped nursing bottle of the present invention may be had by reference to the drawing figures wherein.

DESCRIPTION OF THE EMBODIMENTS

Figure 1:
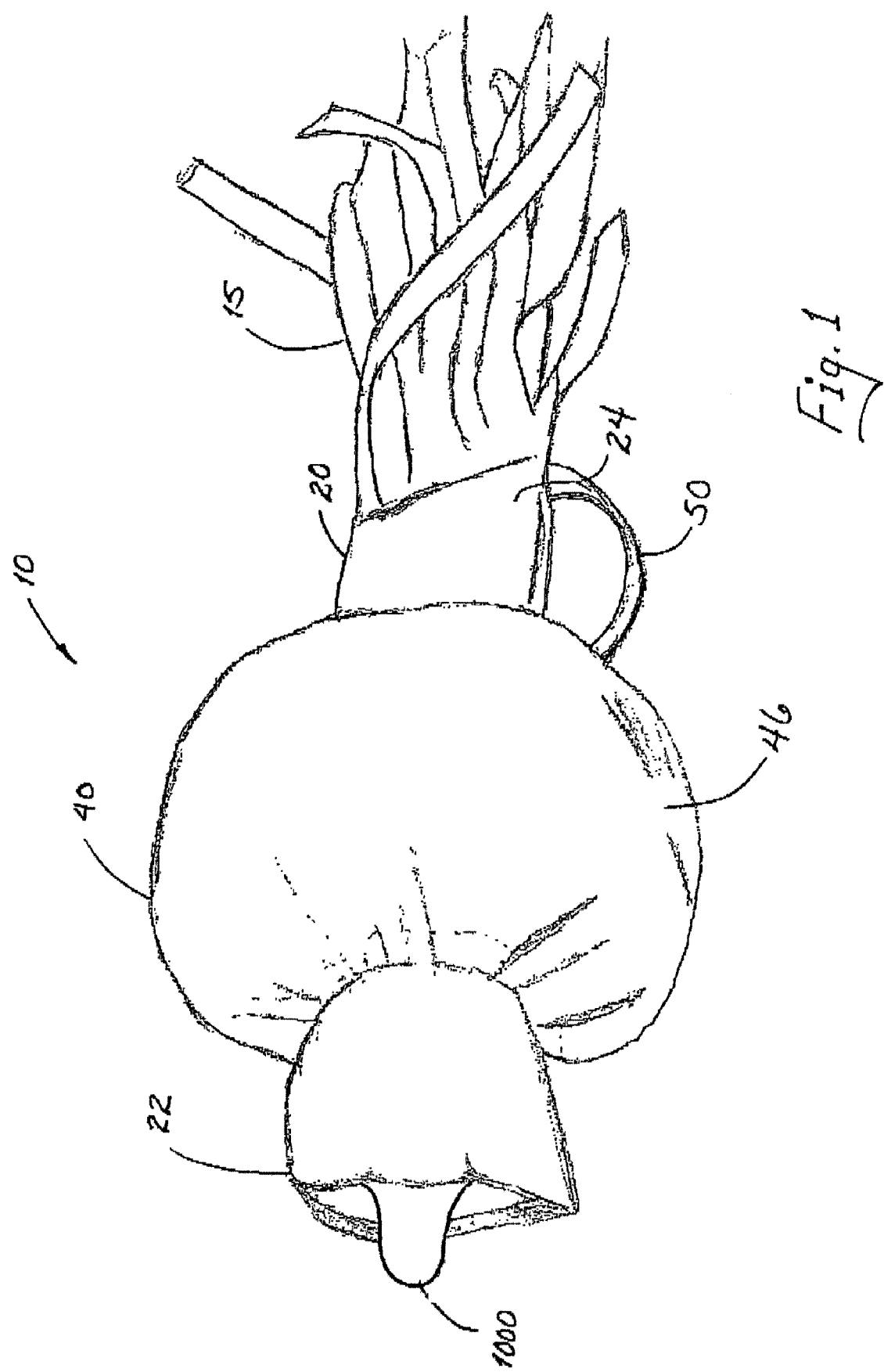
FIG. 1 is a perspective view of the nipple topped nursing bottle holder of the present invention.

In FIG. 1, the bottle holder 10 for a nipple topped nursing bottle of the present invention is shown. Within the bottle holder 10 is a nipple topped nursing bottle 1000. Such nipple topped nursing bottles 1000 are available in a variety of sizes for different types of animals from suppliers such as PetAg.

The present invention includes two parts. The first part is an expandable fabric sleeve portion 20 which is sized to cover and fit snugly around the fluid containing portion of a nursing bottle. As in my prior U.S. Pat. No. 6,772,891, the top of the fabric sleeve portion includes a small collar or ring 22 in which baby animals may place their nose and mouth when sucking liquid from the nursing bottle through the nipple. The second portion is a ring or cylindrical substantially toroidal-shaped donut piece 40. The cylindrical substantially toroidal-shaped donut piece 40 is sized to fit snugly around the expandable sleeve portion 20 so that it will stay in place with respect thereto but loose enough so that it may be slid along the length of the sleeve portion 20 surrounding the nursing bottle 1000 to be positioned according to the size of the baby animal where the claws on the front paws of the baby animals would contact the sides of the nipple topped nursing bottle 1000.

It has been found that when the baby animals are quite small, such as baby animals who have been orphaned shortly after being born, that the substantially toroidal shaped donut piece 40 must be placed near the nipple on top of the nursing bottle. As the baby animal overcomes its reluctance to use a nipple topped nursing bottle 1000, the substantially toroidal shaped donut piece 40 may be slid down along the nursing bottle 1000 to a location where the paws of the baby animal may make contact with the substantially toroidal ring shaped piece 40.

It has also been found that the size and shape of the substantially toroidal ring shaped piece 40 differs depending on the type and size of the animal being nursed. For example, the substantially toroidal ring shaped donut piece 40 shown in FIG. 1 for nursing a kitten must be smaller and rounder than that used for nursing a puppy as kittens knead with their front paws while nursing.

Figure 2:
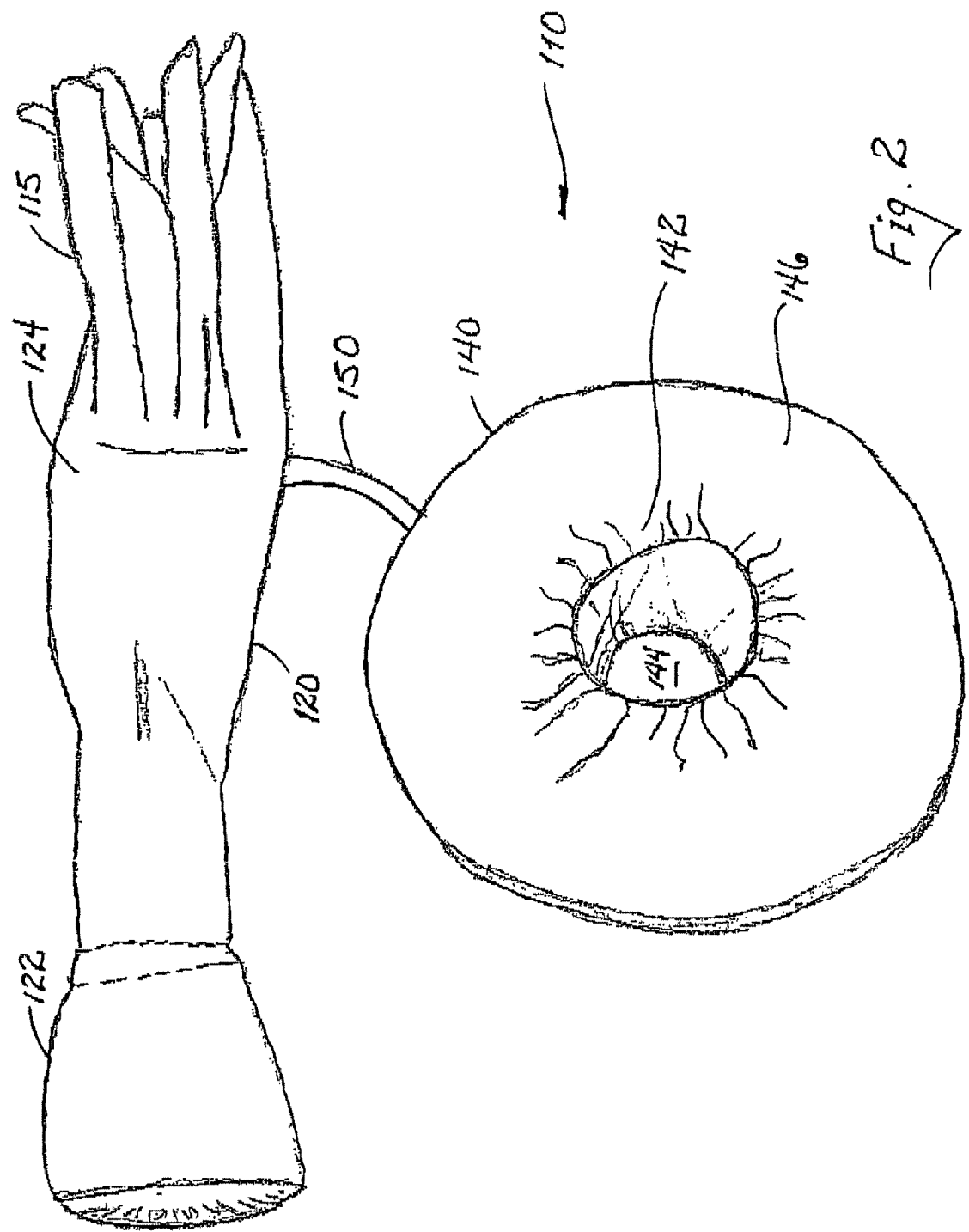
FIG. 2 is a perspective view of the fabric sleeve portion surrounding the nipple and the squeezable toroidal ring separated one from another but connected to the nursing bottle holder by a tether.

In the embodiment 110 shown in FIG. 2, similar parts to those in FIG. 1 are given the same reference numbers but for the numeral 1 in the hundreds place. The center portion 142 of the substantially toroidal shaped donut piece 140 is collapsed more around the central opening 144 than in the embodiment 10 shown in FIG. 1 as the embodiment shown in FIG. 2 is best used with puppies that push or knead the substantially toroidal shaped piece 140 with their paws while nursing.

Figure 3:
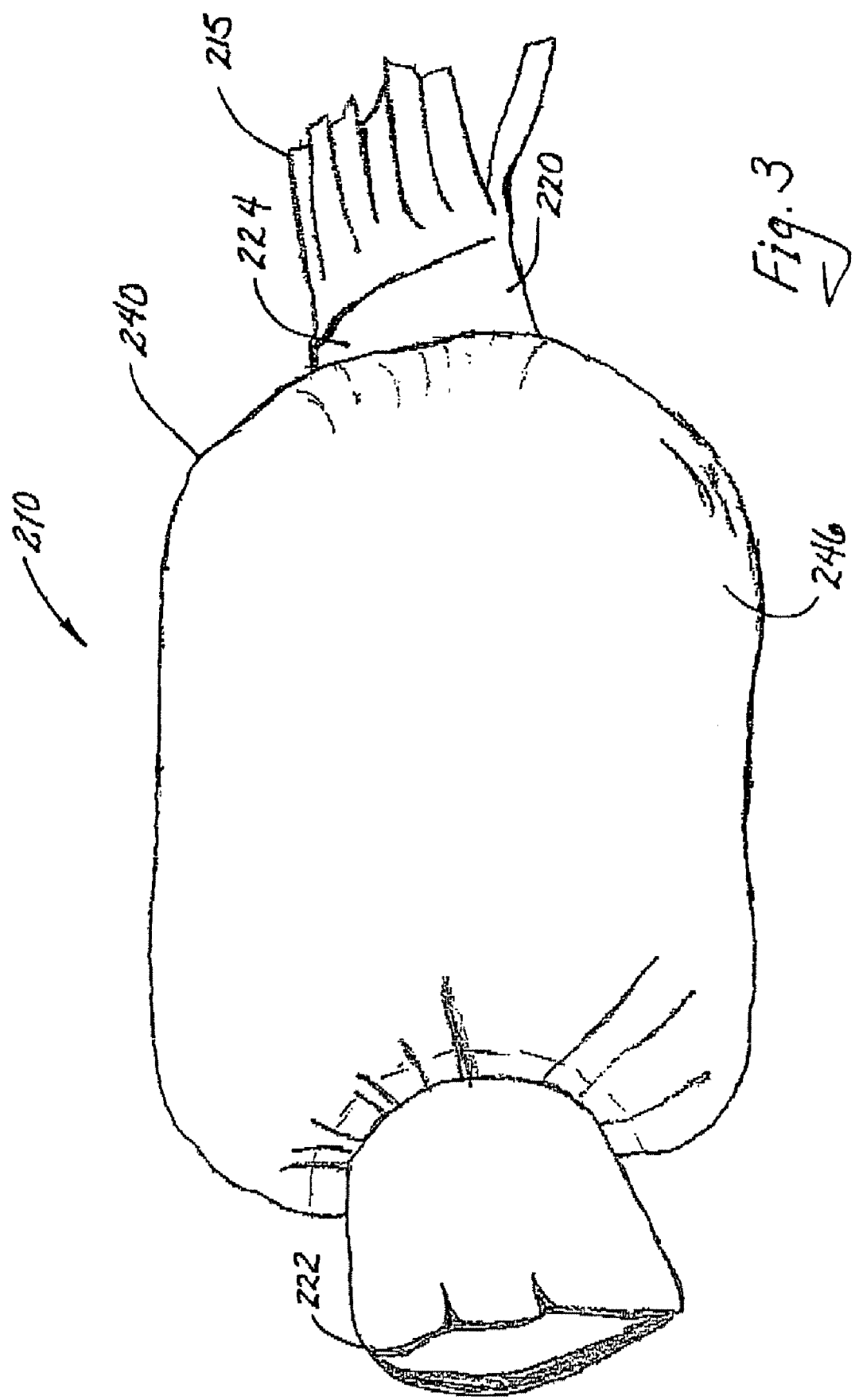
FIG. 3 is a perspective view of the nipple topped nursing bottle holder for use with larger animals.

In the embodiment 210 shown in FIG. 3, similar parts to those in FIG. 1 bear the same reference number but for the numeral 2 in the hundreds place. The substantially toroidal shaped donut piece 240 is made larger. This embodiment is best used when nursing primates who grab and squeeze the substantially toroidal ring shaped donut piece 240 with both their hands and feet while nursing. A large substantially toroidal shaped donut piece 240 may also be used when feeding animals with large paws such as baby lions or baby tigers with a nipple topped nursing bottle 1000.

Further it has also been found that the softness or squeezability of the substantially toroidal shaped piece 40, 140, 240 should be adjusted based on the size and strength of the front paws of the animal to enhance the willingness of the baby animal consume liquid from the disclosed nursing system 10, 110, 210.

Because the sense of smell is so important to baby animals for recognition of a safe condition or a dangerous condition, the fabric 24, 124, 224 used for the sleeve portion 20, 120, 220 and the fabric 46, 146, 246 used to cover the substantially toroidal ring shaped piece 40, 140, 240 may be pre-scented so that the baby animal may recognize its own smell, the smell of its mother or the smell of its siblings.

In many situations it is necessary to warm the milk or liquid contained in the nursing bottle so that the digestive system of the baby animal will properly accept the liquid. In some cases the nursing process takes so long that the milk or liquid contained in the nursing bottle 1000 cools. To prevent such cooling of the milk or liquid contained in the nursing bottle 1000, the cover or sleeve 20, 120, 220 surrounding the nursing bottle may either be made from an insulating material it may include an insulating layer. This insulating layer assists in maintaining the temperature of the milk or liquid contained in the nursing bottle at a temperature acceptable to the baby animal. Such insulating fabrics or fabrics with an insulating layer are well known to those of ordinary skill in the art.

As the substantially toroidal ring shaped donut piece 40, 140, 240 may slide off either end of the nursing bottle 1000, a tether 50, 150 may be used as shown in FIG. 1 and FIG. 2 respectively. The tether 50, 150 is used to keep the substantially toroidal ring shaped piece 40, 140 attached to the cover 20, 120 over the nursing bottle 1000.

Figure 4:
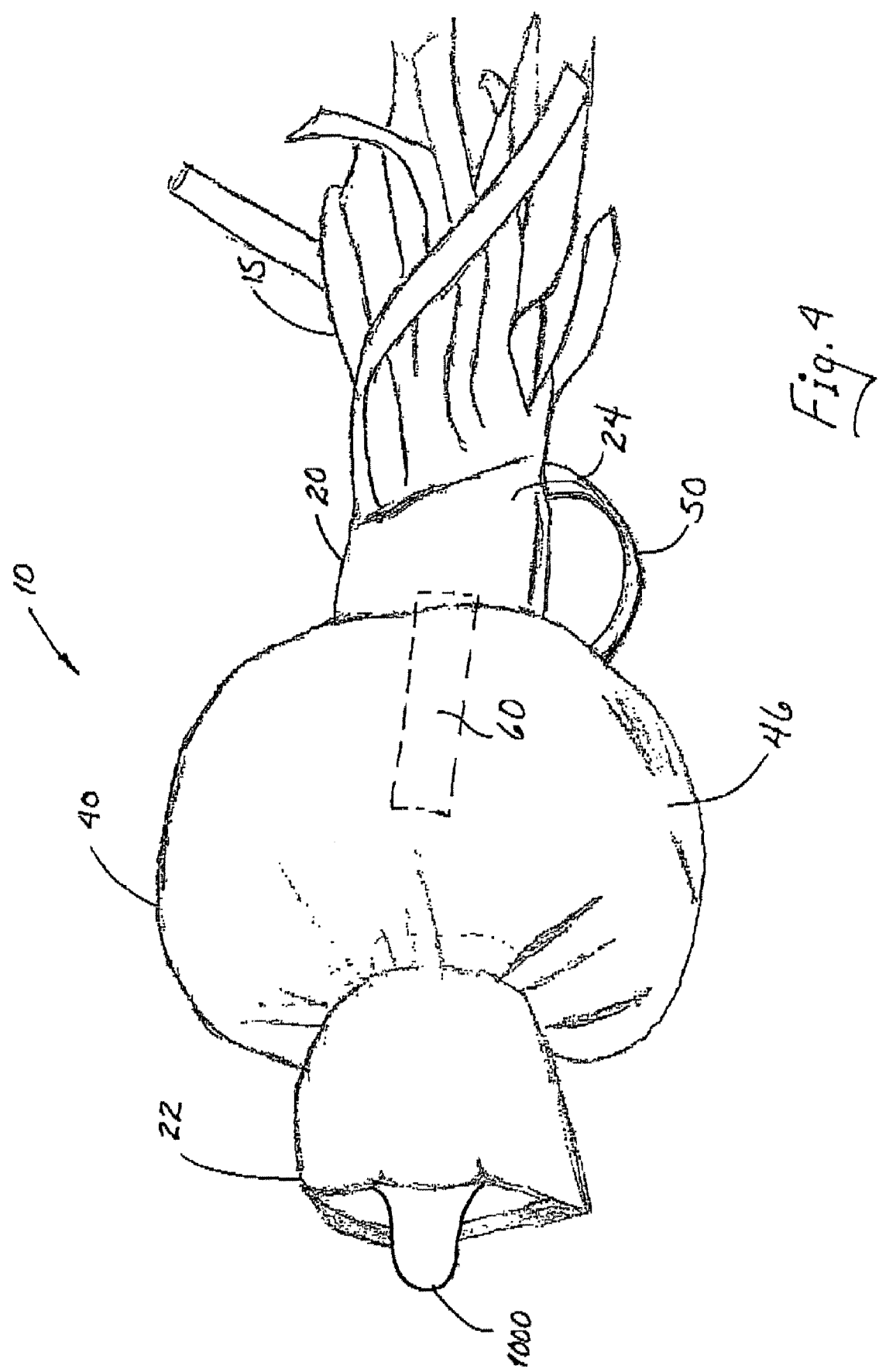
FIG. 4 is a perspective view of the bottle holder shown in FIG. 1 with the addition of a heating or warming module.

In other situations, particularly in areas removed from food preparation spaces, it may not be possible to warm up the milk or the liquid contained the nursing bottle. In such situations a warmer 60, as shown in FIG. 4, may be added to the cover 20 surrounding the nursing bottle 1000. Such warmers 60 may be electrically powered as in an electric blanket, may be chemically powered as in the hand warmers used in northern climates or may employ some form of high frequency energy.

Figure 5:
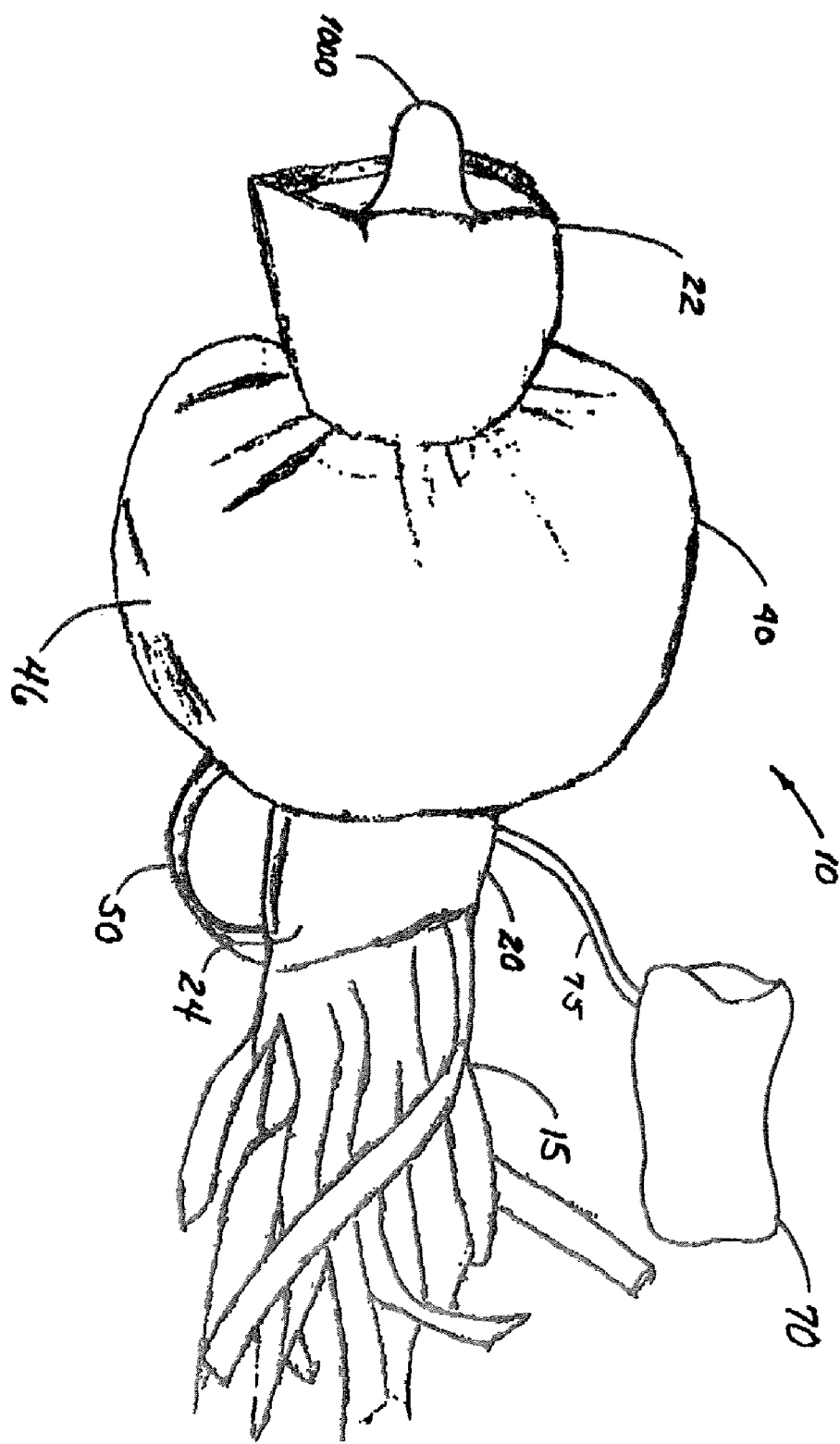
FIG. 5 is a perspective view of the bottle holder shown in FIG. 1 including a tethered pillow.

Those nursing baby animals have often found that the act of nursing a baby animal often causes the baby animal to get sleepy and possibly even go to sleep while nursing. When an animal care technician is holding a baby animal there is typically no place for the baby animal to place its head when the baby animal goes to sleep during the nursing process. Accordingly, it has been found that attaching a small pillow 70, as shown in FIG. 5, sized to fit the head of the baby animal and tethered 75 to the cover 20 for the nursing bottle 1000 will allow the baby animal to sleep comfortably.

Figure 6:
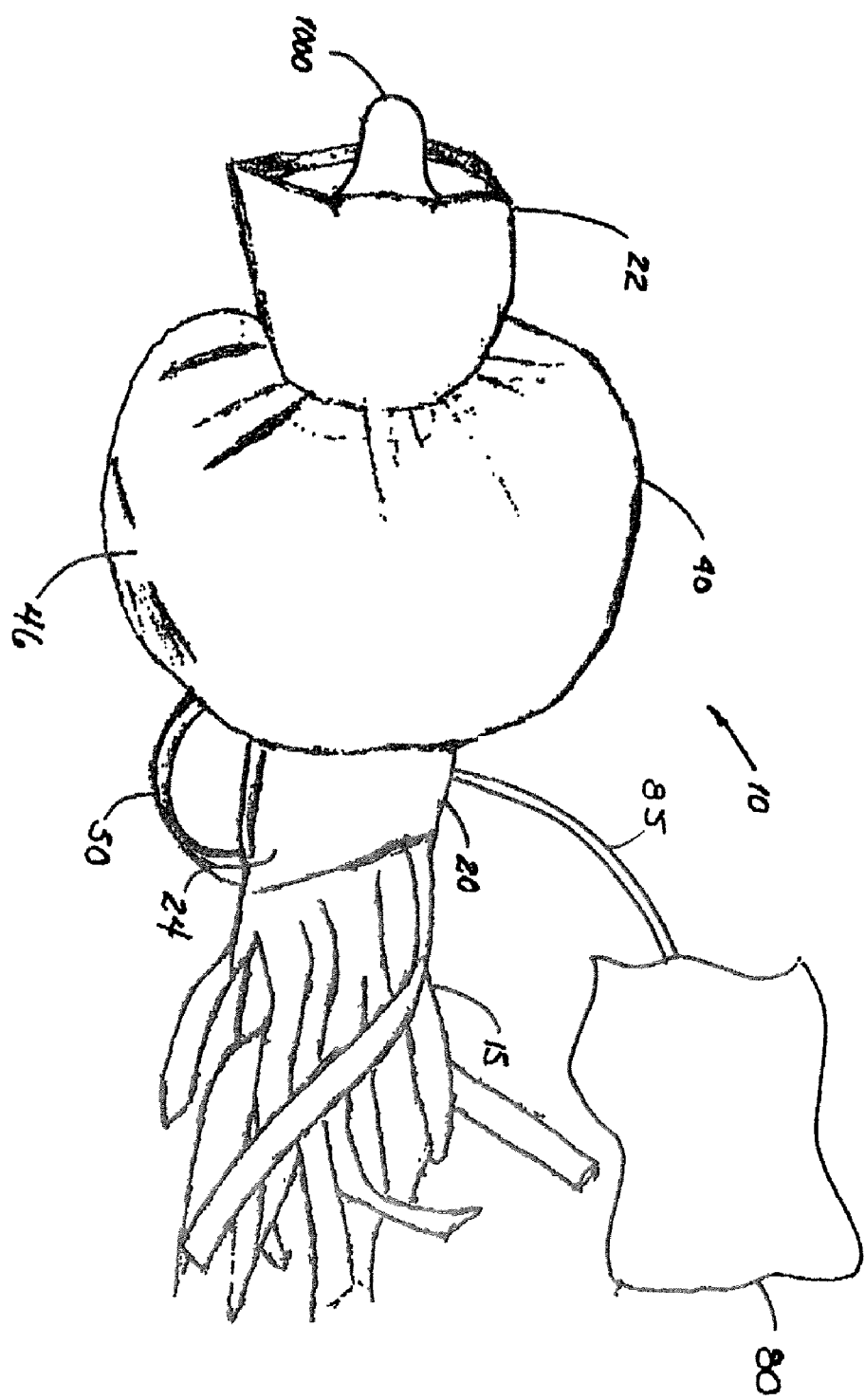
FIG. 6 is a perspective view of the bottle holder shown in FIG. 1 including a tethered blanket.

Still other animal care technicians nursing baby animals have often found that keeping the baby animal warm will also enhance the nursing process. To assist in keeping the baby animal warm, it has been found that a small blanket 80, as shown in FIG. 6, sized to cover the body of the baby animal may be used to keep the baby animal warm. Such blanket 80 may be attached to the cover 20, for the nursing bottle 1000 with a tether 85.

Figure 7:
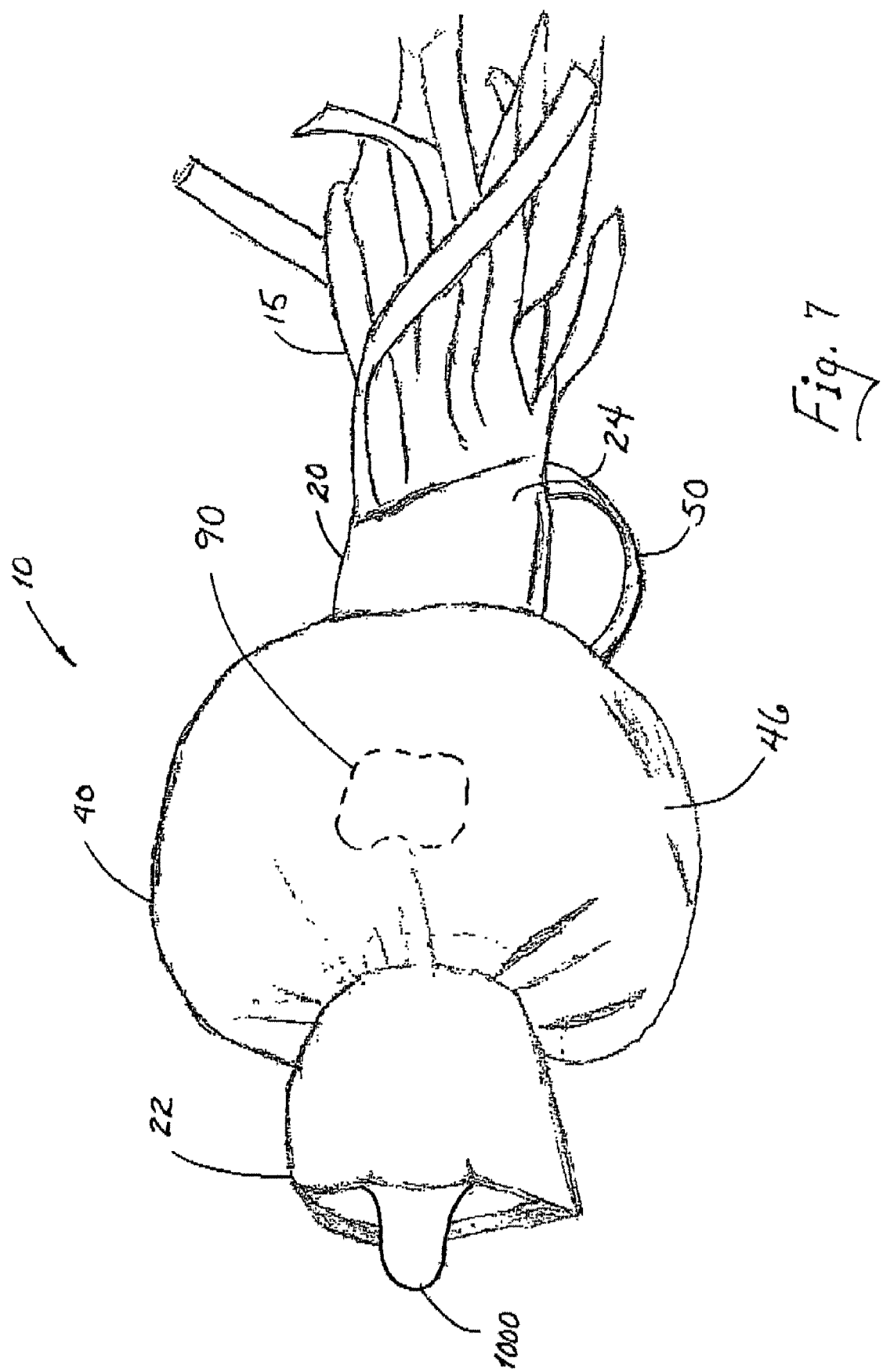
FIG. 7 is a perspective view of the bottle holder shown in FIG. 1 including a physical stimulation device.

In those situations in which baby animals are reluctant to nurse from a nipple topped nursing bottle, it has been found that an additional external stimulus may be required. Such additional external stimulus 90, as shown in FIG. 7, may be a gently pulsing device which simulates the pulsing of a mother's heart. In such cases a small pulsing device may be included with the cover 20 for the nursing bottle 1000 or within the substantially toroidal ring shaped donut piece 40. In yet other situations, the rhythmic sound of the beating of a mothers heart may be what is needed to encourage a baby animal to take milk or liquid from a nipple topped nursing bottle.

Another utility for the disclosed invention occurs when the time comes for weaning a baby animal away from dependence on the use of a mother's breast for receiving milk. In many situations, the baby animal refuses to take liquid from a nipple topped nursing bottle thus endangering the health of the baby animal. In such situations it is important that the refusal to take liquid from a nipple topped nursing bottle 1000 must be overcome quickly or the health of the baby animal may be endangered. The disclosed invention shortens the time in which a baby animal can be weaned away from dependence on the use of a mother's breast for obtaining nutrition.

While the present invention has been described according to its use with baby animals, it has also been found that it also has utility with the human infants. Specifically, human infants appear to nurse better from a nipple topped nursing bottle if they have an object placed at location where their hands and fingers can be used to grab and squeeze while nursing. Accordingly, all the features and embodiments of the disclosed invention also have utility with decreasing the reluctance of human infants to take milk or liquid through the nipple or a nipple topped nursing bottle.

As indicated above, a key part of the nursing process is increasing the satisfaction and pleasure given to the person who is nursing either a baby animal or a human infant using a nipple topped nursing bottle. One method of increasing the satisfaction and pleasure of the person nursing either a baby animal or a human infant is to enhance the visual and tactile feedback obtained during the nursing processing. Such visual feedback may be obtained by decorating the bottle holder 10, 110, 210 with fringe 15, 115, 215, or using fabrics which cover either the nursing bottle or the substantially toroidal ring shaped donut piece 40, 140, 240 which are colorful or have a pleasing feel. In some situations, it has been found that making the substantially toroidal ring shaped donut piece 40, 140, 240 look like a ball such as a basketball, a soccer ball, a football or a baseball may enhance the visual feedback for parents who participate in such sports. In other embodiments, the sleeve portion around the bottle may be made to look like a hammer or a wrench. In still other embodiments, the cover portion 20, 120 around the bottle may be made to look like a clown, a flower or barnyard, zoo or marine animals.

While the disclosed invention has been described according to its preferred and alternate embodiments, those or ordinary skill in the art will understand that numerous other embodiments have been enabled by the foregoing description. Such other embodiments shall be included within the scope and meaning of the appended claims.

What is claimed is:

1. A system for causing baby animals who are reluctant to take fluid from a sleeve covered nipple topped nursing bottle to take fluid from a sleeve covered nipple topped nursing bottle, said system comprising:
   an expandable fabric sleeve portion for covering the nippled-topped nursing bottle;
   a fabric collar surrounding the nipple;
   a tethered, slidable, squeezable donut portion constructed and arranged to surround said expandable fabric sleeve portion and to be positionable along the length of the nipple topped nursing bottle from a location substantially surrounding the nipple to a position along the nursing bottle away from the nipple;
   wherein said tethered, slidable, squeezable donut portion is positionable along the length of the nursing bottle with respect to said fabric collar depending on the size of the baby animal or human infant so that the baby animal or a human infant is able to squeeze said slidable, squeezable donut portion while receiving fluid from said nippled-topped nursing bottle.

2. The bottle sleeve as defined in claim 1 wherein said fabric collar and said slidable, squeezable donut portion is covered with a pre-scented fabric.

3. The bottle sleeve as defined in claim 1 further including a pillow sized to hold the head of the baby animal or human infant tethered thereto.

4. The bottle sleeve as defined in claim 1 further including a blanket sized for covering the baby animal or human infant tethered thereto.

5. An improvement to a nursing system using a fabric covered nipple topped nursing bottle for use with a baby animal or a human infant comprising:
   a cover surrounding the nipple topped nursing bottle, said cover including:
      a fabric collar surrounding the nipple;
      a fabric sleeve for covering the nursing bottle;
      a tethered substantially toroidal squeezable ring encircling said fabric sleeve;
      said substantially toroidal squeezable ring being positional along the length of the nipple topped nursing bottle;
      whereby said tethered, slidable, squeezable donut portion is positionable along the length of the nursing bottle with respect to said fabric collar depending on the size of the baby animal or human infant so that the baby animal or human infant is able to squeeze said substantially toroidal squeezable ring with its claws or fingers while nursing.

6. The nursing system as defined in claim 5 wherein said fabric collar and said fabric sleeve are made from a pre-scented fabric.

7. The nursing system as defined in claim 5 further including a pillow suitable for holding the head of the baby animal or the human infant tethered to said fabric sleeve.

8. The nursing system as defined in claim 5 further including a blanket suitable for covering the body of the baby animal or the human infant tethered to said fabric sleeve.

* * * * *